Jan. 24, 1967   J. E. GEE ETAL   3,299,547
TRACTOR LEVELING DEVICE FOR EARTHMOVING SCRAPERS
Filed June 29, 1964   3 Sheets-Sheet 1

INVENTORS
JAMES E. GEE
BY FRANK H. WINTERS
ATTORNEYS

Jan. 24, 1967 J. E. GEE ETAL 3,299,547
TRACTOR LEVELING DEVICE FOR EARTHMOVING SCRAPERS
Filed June 29, 1964 3 Sheets-Sheet 3

INVENTORS
JAMES E. GEE
BY FRANK H. WINTERS

ATTORNEYS 3,299,547
TRACTOR LEVELING DEVICE FOR
EARTHMOVING SCRAPERS
James E. Gee, Washington, and Frank H. Winters, Joliet, Ill., assignors to Caterpillar Tractor Co., Peoria, Ill., a corporation of California
Filed June 29, 1964, Ser. No. 378,687
6 Claims. (Cl. 37—129)

This invention relates to means for maintaining the tractor of a two axle tractor-scraper combination at a substantially constant or level attitude during raising and lowering adjustments of the scraper bowl.

Many two axle tractor-scraper combinations, that is a two wheel scraper articulately connected with a two wheel tractor, include draft arms pivoted to the sides of the scraper bowl. With this arrangement the bowl and its cutting edge are raised and lowered with respect to the draft arms and tilting movement of the tractor about its own axle is negligible.

The capacity of a scraper bowl is best increased by increasing its height or its width. Increased height is undesirable because it greatly increases power required to fully load a bowl. Increase in width is desirable but limited by maximum dimensions established by shipping regulations.

Elimination of the draft arms which are disposed outside of the bowl enables a substantial increase in bowl width and, with the draft arms removed, a draft connection has been made directly between the tractor and a gooseneck which is pivoted to the forward end of the bowl. An extensible link between the gooseneck and the bowl then serves to raise and lower the bowl with respect to the ground. Such a "wide bowl" construction is illustrated in our assignee's patent to R. A. Peterson et al. No. 3,035,361.

An objection to the above described means for raising and lowering the bowl of a scraper is that, as the bowl attitude changes so must that of the gooseneck and tractor to which it is connected. Thus in some positions the tractor does not have full ground clearance and at times the operator's view is obstructed or he is otherwise uncomfortably or awkwardly disposed.

It is the object of the present invention to overcome the above described disadvantages of wide bowl scrapers and to provide such a tractor-scraper combination in which the attitude of the tractor is maintained substantially constant by means operating automatically as the scraper bowl is raised and lowered.

Further and more specific objects and advantages of the invention are made apparent in the following specification wherein reference is made to the accompanying drawings.

Figure 1:
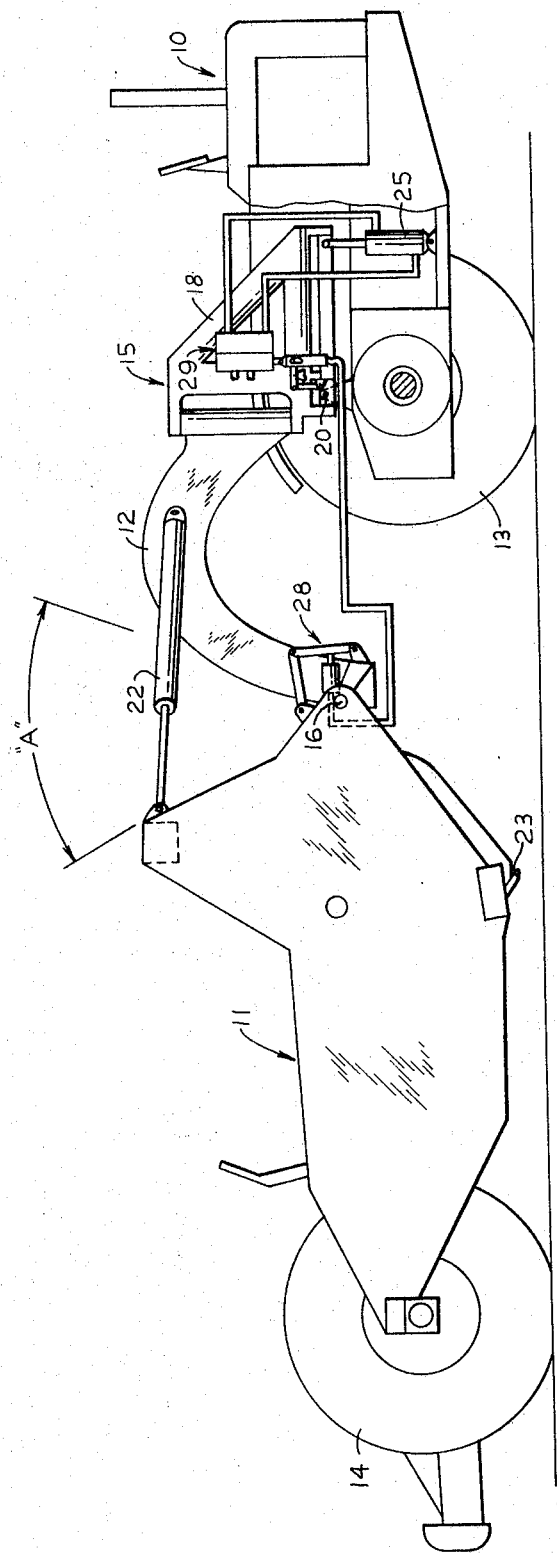
FIG. 1 is a view in side elevation with parts in section of a tractor-scraper combination showing a wide bowl scraper and the application of the present invention thereto.

A tractor generally indicated at 10 in FIG. 1 of the drawings is shown as drawing a scraper 11 through a draft connection which includes a gooseneck 12. The tractor is supported on wheels 13 and the scraper is supported on wheels 14. The gooseneck 12 is connected with a more or less conventional tractor hitch indicated generally at 15 and is pivotally connected to the scraper on a transverse axis indicated at 16. The tractor hitch 15 includes a more or less conventional A frame 18. That portion of the A frame to which the gooseneck 12 is secured is supported for rocking motion about a transverse axis indicated at 20. The bowl of the scraper 11 may be raised and lowered about the axis of the wheels 14 by a hydraulic cylinder or pair of cylinders, one of which is shown at 22 as extending between the gooseneck 12 and the upper forward portion of the bowl. Hydraulic fluid under pressure from a suitable source, not shown, is supplied to the cylinder 22 and controlled in the conventional manner by control valves at the operator's station of the tractor. This enables movement of the bowl between a lower position with its cutting edge 23 imbedded in the earth to an upper or carry position where the bottom of the bowl clears the earth. During such raising and lowering movement of the bowl the relative position of the bowl and gooseneck change varying in angular relationship to each other as indicated by the angle A shown in FIG. 1, the apex of which converges at the pivot 16. It is apparent that without the transverse pivotal connection 20 of the A frame 18 the tractor would be compelled to rock about the axis of its wheels 13 on raising and lowering of the bowl.

In accordance with the present invention a hydraulic jack illustrated at 25 is interposed between the tractor and that portion of the A frame 18 which is pivotal about the axis 20. Consequently adjustment of the jack 25 during vertical adjustment of the scraper bowl can be employed to maintain the tractor level and prevent any substantial oscillation about the axis of its wheels. Such adjustment is accomplished by a master cylinder mechanism generally indicated at 28 which in turn actuates a control valve generally indicated at 29 for supplying fluid under pressure selectively to opposite ends of the jack 25.

Figure 2:
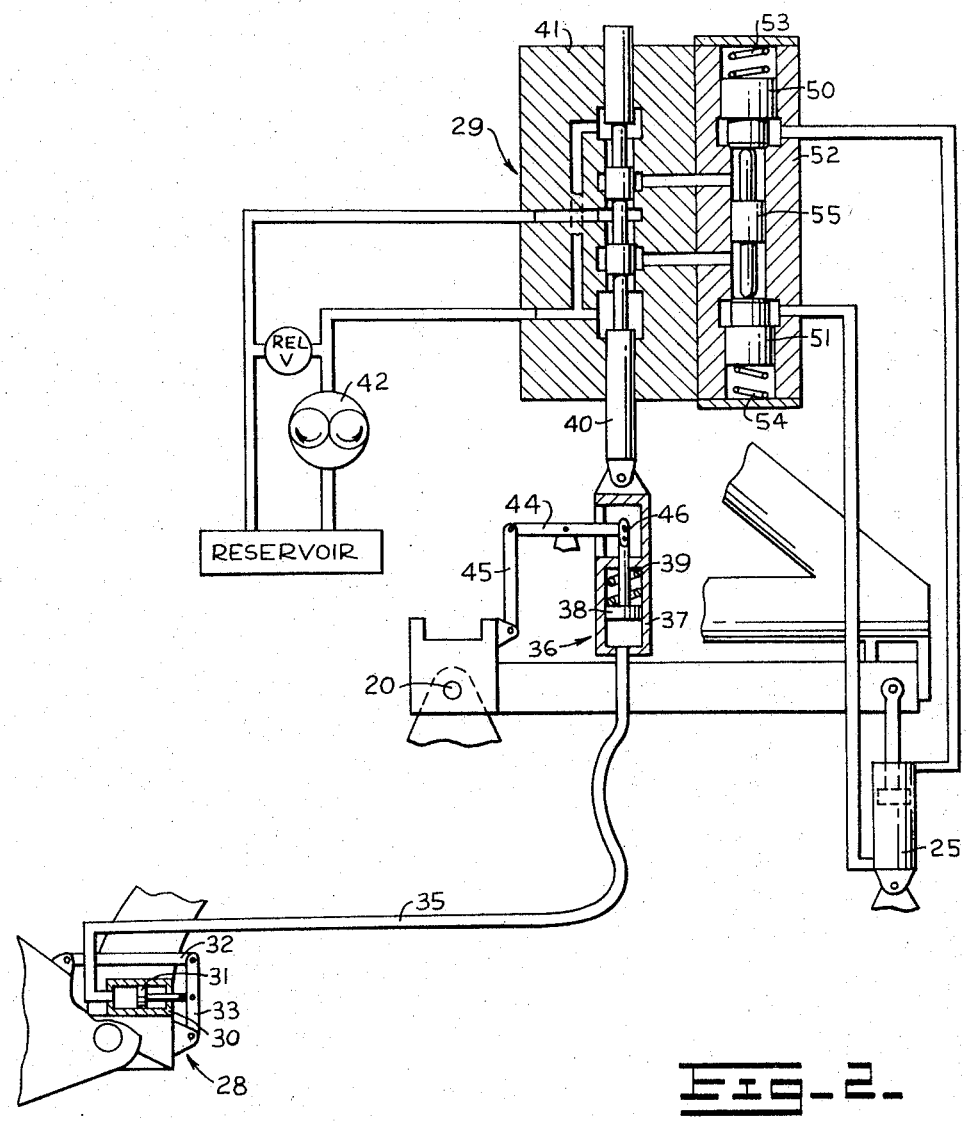
FIG. 2 is a schematic view of the hydraulic circuitry employed for maintaining the tractor in a level position during raising and lowering of the scraper bowl.

The master slave control mechanism just described is best illustrated in FIG. 2 wherein the master cylinder assembly is shown as including a cylinder 30 with a piston 31. The cylinder is carried by the gooseneck 12 and a pair of links 32 and 33 are pivotally connected between the scraper bowl and the gooseneck and are connected to each other. The link 32 is aligned with the rod of the piston 31 so that upon raising movement of the bowl which enlarges the angle A of FIG. 1, link 32 will urge the piston 31 inwardly of the cylinder forcing fluid therefrom through a conduit 35 communicating with the slave system 36 on the tractor. The slave system comprises a cylinder 37 with a piston 38 and a spring 39 normally urging the piston downwardly. Fluid entering the cylinder 37 will impart downward movement to the cylinder since the piston is relatively fixed as will presently appear and the cylinder is connected to a spool 40 of a spool valve 41 in the valve assembly 29. A downward movement of the spool adjusts the valve to admit fluid under pressure from a pump 42 and direct it to the rod end of the jack 25. This will affect downward swinging movement of A frame 18 about pivot 20 and compensate for the downward movement of the forward end of the tractor that would otherwise occur.

The opposite or lowering movement of the bowl will affect compensation in the opposite manner by permitting the piston 31 to move toward the left in its cylinder 31 thus withdrawing oil from slave cylinder 37 which causes it to move upwardly under influence of the spring 39. This urges the valve spool 40 to direct oil under pressure to the head end of the jack 25 to produce compensating adjustment of the tractor opposite to that previously described. The valve spool 40 is moved to a neutral position when adjustment of the scraper is discontinued through linkage connecting the A frame 18, the tractor and the piston of the slave cylinder 37. This linkage includes a lever 44 pivoted centrally to a bracket on the tractor and connected by a link 45 at one end to a portion of the A frame and by a link 46 at the other end to the rod of piston 38. Since, when the scraper discontinues movement, the A frame comes to rest but the tractor tends to move because of continued supply of fluid to the jack 25, relative movement between the tractor and A frame will adjust the piston 38 through the linkage described and consequently the cylinder 37 and valve spool 40 controlled by it. In order to prevent the high pressure developed in jack 25 from being exerted on the spool valve 41 a pair of check valves 50 and 51 is provided in a cylinder 52 associated with the spool valve. These check valves normally closed by springs 53 and 54 prevent return flow from either end of jack 25 to the spool 41. However, when fluid under pressure from the pump 42 is directed through the valve it opens either one or the other of check valves 50 or 51 and simultaneously urges a piston 55 against the other check valve to hold it in an open position to permit return fluid to pass through the valve 41.

Figure 3:
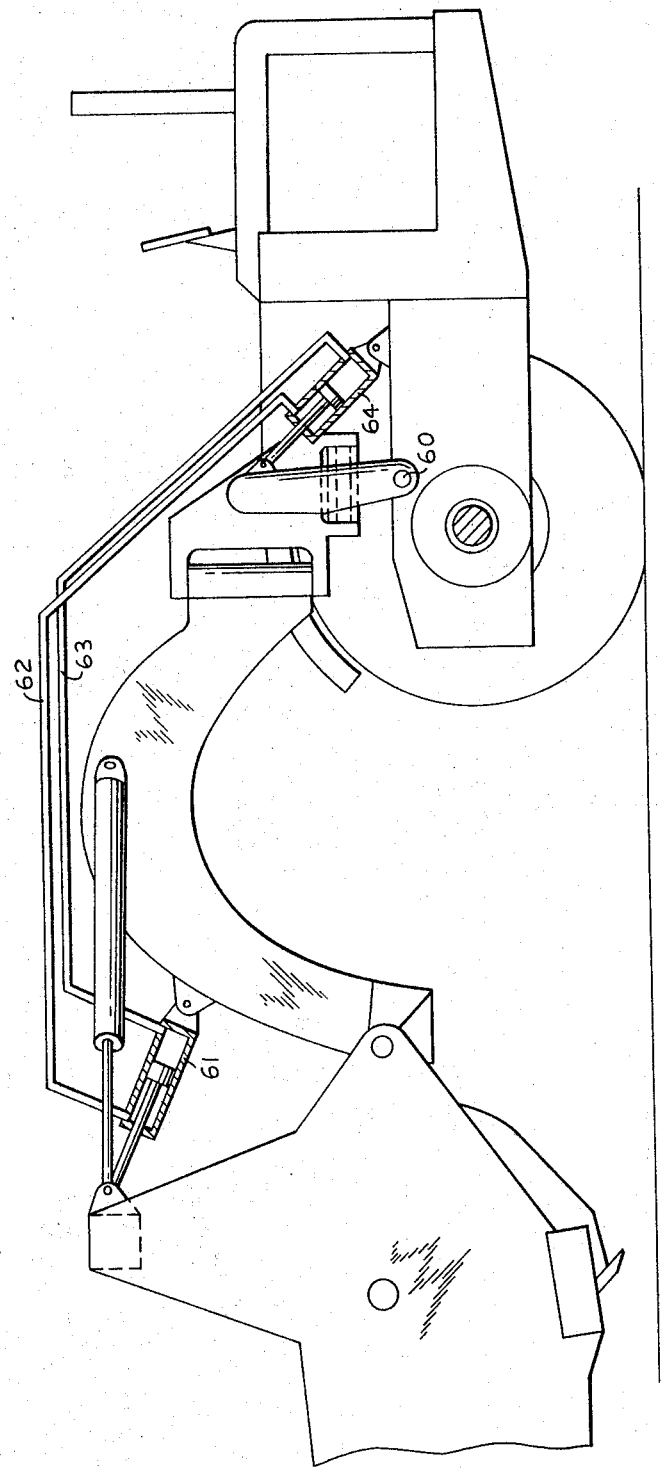
FIG. 3 is a fragmentary view in side elevation of a tractor-scraper combination illustrating a modified form of the present invention with the hydraulic circuit shown schematically.

A modified form of the invention is illustrated in FIG. 3 wherein a closed circuit master-slave system is employed for providing the force required to adjust the position of the tractor relative to the gooseneck. In this view the hitch, which performs the function of the A frame 18 in FIG. 1, is supported with respect to the tractor on a transverse axis shown at 60. A master cylinder shown at 61 is disposed between the gooseneck and the bowl to be actuated upon raising and lowering of the bowl and urge fluid through lines 62 and 63 communicating between its opposite ends and the opposite ends of a slave cylinder 64 connected between the tractor and the hitch assembly to cause it to rock about the transverse axis 60. This system affects the same relative adjustment of the position of the tractors as the system illustrated in FIG. 1 which employs hydraulic fluid from a source under pressure.

We claim:

1. A tractor leveling device for a two axle tractor scraper combination in which the tractor and scraper are hingedly connected about a horizontal pivot comprising means to impart tilting movement to the tractor about its axle, means to adjust the scraper vertically and means operable automatically upon vertical adjustment of the scraper and in response to resulting variation in the angle between the tractor and the scraper to activate the tractor tilting means for maintaining the tractor in a substantially level position.

2. The combination of claim 1 in which the means to tilt the tractor is hydraulically powered, and the means to automatically activate the tilting means includes hydraulic means to sense the attitude of the scraper.

3. A tractor leveling device for a two axle tractor-scraper combination comprising a two wheel scraper, a forwardly extending member pivoted to the scraper on a transverse axis, a two wheel tractor, an articulate hitch member between the tractor and said member including a pivotal connection on a transverse axis, extensible means between the scraper and said member for raising and lowering the forward end of the scraper, extensible means between the tractor and the hitch member to vary the angle of the tractor with respect to the hitch member and means operable automatically when the scraper is raised and lowered and in response to resulting variation in the angle between the tractor and the scraper to activate the means between the tractor and hitch member.

4. The combination of claim 3 including a master cylinder connected between the scraper and forwardly extending member, a slave cylinder extending between the tractor and hitch, and a closed hydraulic circuit connecting said master and slave cylinders.

5. The combination of claim 3 including a hydraulic jack between the tractor and the hitch, a source of hydraulic fluid, a valve for controlling flow of fluid to and from opposite ends of said jack, and means to adjust said valve including a slave cylinder on the tractor connected to the valve, and a master cylinder in circuit with the slave cylinder and actuated by relative movement of the scraper and said member to direct fluid to the slave cylinder and actuate the valve.

6. The combination of claim 5 in which raising and lowering of the scraper causes opening of the valve to direct fluid selectively to opposite ends of the jack, and connections between the tractor and the slave cylinder to neutralize the valve upon movement of the tractor about its axle after movement of the scraper about its axle has stopped.

References Cited by the Examiner

UNITED STATES PATENTS

| 2,815,223 | 12/1957 | Wharton | 280—406 |
| 2,891,331 | 6/1959 | Rleska | 280—405 |
| 3,123,381 | 3/1964 | Poore | 37—124 |

ANTONIO F. GUIDA, *Acting Primary Examiner.*

ABRAHAM G. STONE, A. E. KOPECKI,
*Assistant Examiners.*